Feb. 10, 1959         C. A. MILLER         2,873,441
                        CONVERTER
Filed Feb. 18, 1955                    2 Sheets-Sheet 1

INVENTOR.
CARL A. MILLER

BY *Theodore H. Lassagne*

ATTORNEY

Feb. 10, 1959  C. A. MILLER  2,873,441
CONVERTER
Filed Feb. 18, 1955  2 Sheets-Sheet 2

INVENTOR.
CARL A. MILLER
BY
*Theodore H. Lasagna*
ATTORNEY

United States Patent Office 2,873,441
Patented Feb. 10, 1959

2,873,441

CONVERTER

Carl A. Miller, Van Nuys, Calif., assignor to Librascope, Incorporated, Glendale, Calif., a corporation of California Application February 18, 1955, Serial No. 489,010

10 Claims. (Cl. 340—347)

This invention relates to apparatus for converting analogue quantities to a plurality of signals in digital form and more particularly to apparatus for obtaining the analogue-to-digital conversion accurately and without any ambiguity. The invention is especially adapted to convert a mechanical displacement representing an analogue quantity into a plurality of electrical signals representing the quantity in digital form.

In recent years, the requirement for accurate control of displacements of different members such as tools or guns has become increasingly pronounced. Such members are generally driven by motors which are controlled by changing voltages introduced to the motors which voltages are analogue representations of values. In order to determine whether such a member is being properly displaced at all instants, the displacement of the members is fed back into a device capable of making computations to determine the subsequent movement of the member necessary to bring it as soon as possible to the desired displacement. Since the computations must be as accurate as possible, the analogue quantities are often converted into digital form and the computation is made on a digital basis.

One type of converter which has been used to convert analogue quantities into digital form includes an information member which is driven by the motor through a distance related to the value of the analogue quantity. For example, the information member may be a rotary disc driven through an angular distance related to the value of the analogue quantity. The disc has tracks of conductive and non-conductive portions disposed in rows and in alternate relationship in each row. The conductive and non-conductive portions in each track have equal lengths but the lengths of the portions in successive tracks vary in a progressive geometric relationship. By disposing brushes in contact with the portions in each track, the brushes are able to obtain a plurality of signals which accurately reflect in digital form the angular displacement of the disc.

Since a brush may at times be at the dividing line between a conductive and non-conductive portion, the signal produced by the brush may be ambiguous. In order to avoid such ambiguities and the resultant possibilities of error in conversion, systems have been built which utilize two brushes in association with each track except the first. The brushes in each pair are separated from each other by particular distances dependent upon the lengths of the conductive portions in their associated tracks. Since the lengths of the portions in each track are small, the brushes have had to be relatively close to one another. This has involved difficulties in manufacture and in the proper setting of the brushes to obtain the desired accuracy of conversion.

The conductive portions in some of the converters have had a tendency to chip or wear at the corners as a result of the pressure exerted on the conductive portions by the brushes riding on the portions. Since the path to conductive portions in each row includes the conductive portions of other rows, the wear on some of the conductive portions has had a tendency to interrupt electrical continuity to other conductive portions in certain instances. The interruption has resulted at least in part from the particular arrangement of the conductive and non-conductive portions in adjacent tracks. Because of these electrical interruptions, incorrect digital indications have been sometimes generated in representation of analogue quantities.

This invention provides an information member and brushes arranged in a particular manner relative to one another to overcome at least some of the above difficulties. The invention includes an information member such as a disc in which a plurality of conductive and non-conductive portions are disposed in tracks with the portions of each track staggered by a particular distance relative to the portions of the preceding track. By properly staggering the portions in each track, at least one of the groups of brushes can be disposed in an aligned relationship. Disposing the brushes in an aligned relationship is advantageous since it increases the accuracy with which the brushes can be positioned and thereby increases the accuracy of conversion from analogue to digital quantities.

Properly staggering the brushes is also advantageous since it has tended to insure the continuity of the electrical path to the conductive portions in the different tracks. The continuity of this electrical path is maintained in spite of any tendency of certain conductive portions to chip off at the corners during use. By maintaining the continuity of the electrical path and enhancing the accuracy in the positioning of the brushes, satisfactory operation of a converter utilizing this invention is maintained over long periods of time.

Figure 1:
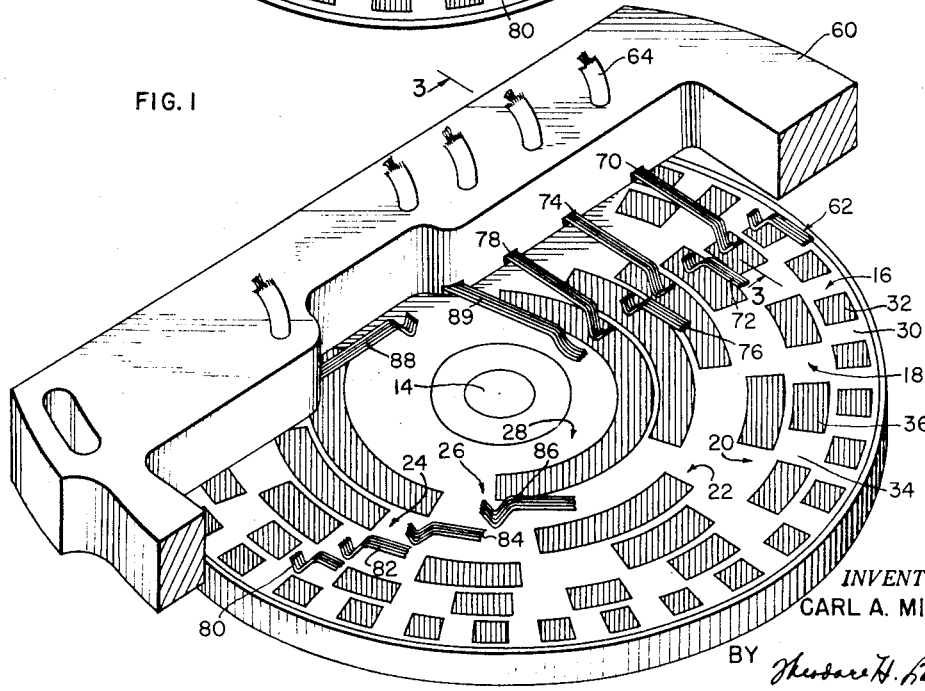
Figure 1 is a perspective view of an information member such as a disc and a brush assembly constituting one embodiment of this invention.
Figure 4:
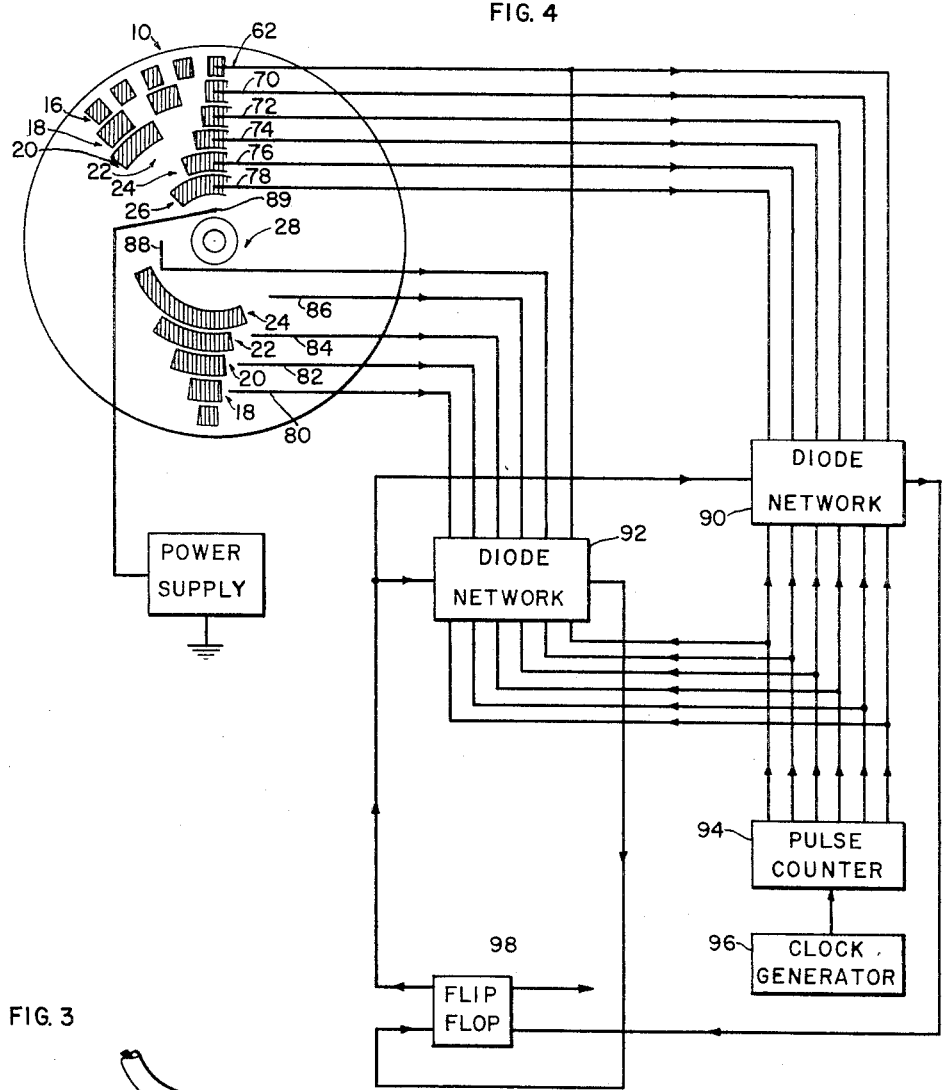
Figure 3:
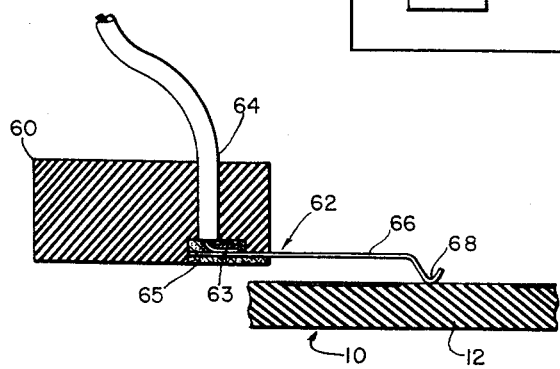

Figure 3 is an enlarged fragmentary sectional view taken substantially on the line 3—3 of Figure 1 and further illustrates the relative disposition of the information member and a representative brush in the brush assembly; and Figure 4 is a circuit diagram, somewhat in block form, schematically illustrating the operation of a converter including the information member and conductor assembly shown in the previous figures.

In the embodiment of the invention shown in the drawings, an information member generally indicated at 10 is formed from a suitable material such as a phenolic copper clad on one side. For example, such a material may be obtained from the National Vulcanized Fiber Company under the designation XXXP, grade 460B. The information member 10 preferably is in the form of a disc 12 mounted on a shaft 14 for rotary movement in accordance with the operation of a suitable motor (not shown).

A plurality of conductive portions may be provided in the disc 12 in alternate relationship with a plurality of non-conductive portions. The conductive portions are provided by covering the copper-clad surface of the disc 12 with a suitable photosensitive material such as a cold-top enamel obtainable from the Eastman Kodak Company of Rochester, New York. The cold-top material is then covered with a pattern so that only particular portions of the disc surface are exposed. These exposed portions are subjected to light to make the enamel coating photosensitive. An etching material such as ferric chloride is next applied to the disc 12 to wash away the photosensitive portions of the enamel coating and the copper layer under these photosensitive portions. The ferric chloride is not able to attack the portions of the enamel coating not previously subjected to light.

After the ferric chloride has been applied, the remainder of the enamel coating is removed by a suitable hypo developer which can be obtained from the Eastman Kodak Company. The copper-clad portions of the disc 12 are then coated with a suitable material such as hard nickel in a layer having a thickness in the order of 50 millionths of an inch. A layer of a suitable material such as rhodium is subsequently applied on the layer of hard nickel in a thickness in the order of 50 millionths of an inch. Rhodium is advantageous because it is a good electrical conductor, does not tarnish and provides a good wearing surface from a mechanical standpoint. The layers of nickel and rhodium may be applied as by plating or spraying or in any other suitable manner.

As a final step, the disc 12 is placed in a press and is subjected to heat and pressure to force the copper, nickel and rhodium into the disc. In this way, the outer surface of the rhodium layer is made flush with the disc to minimize wear on the surface and to minimize any bounce of electrical brushes contacting the surface of the disc as the disc rotates.

The conductive and non-conductive portions on the disc are provided in a particular pattern. The conductive and non-conductive portions are disposed in annular tracks and in alternate relationship in each track. Thus, annular tracks 16, 18, 20, 22, 24, 26 and 28 are formed on the disc 12 and are defined by radii of decreasing value. Conductive and non-conductive portions 30 and 32; conductive and non-conductive portions 34 and 36; conductive and non-conductive portions 38 and 40; conductive and non-conductive portions 42 and 44; conductive and non-conductive portions 46 and 48; and conductive and non-conductive portions 50 and 52 are respectively disposed in the tracks 16, 18, 20, 22, 24 and 26. It should be appreciated that six annular tracks of conductive and non-conductive portions are shown by way of illustration only and that any other number of tracks can be provided on the disc. The annular row 28 is conductive throughout its complete surface area.

The conductive and non-conductive portions in each track have equal angular lengths, and lengths differing in a particular relationship from those of the portions in the other tracks. For example, when an analogue quantity is converted into a plurality of signals digitally representing the quantity in a binary code, the portions in each of the tracks have angular lengths substantially twice as great as the angular lengths of the portions in the preceding track. Thus, the portions in the tracks 18, 20, 24 and 26 respectively have angular lengths substantially twice as great as the portions in the tracks 16, 18, 20, 22 and 24. The lengths of the portions 30 and 32 in the track 16 may be approximately 0.015 inch. The portions 34 and 36 in the track 18 may have a length of approximately 0.030 inch, and the portions 38 and 40 in the track 20 may be approximately 0.060 inch long, etc. The portions in each track have a width in the radial direction such as approximately 0.065 inch.

Figure 2:
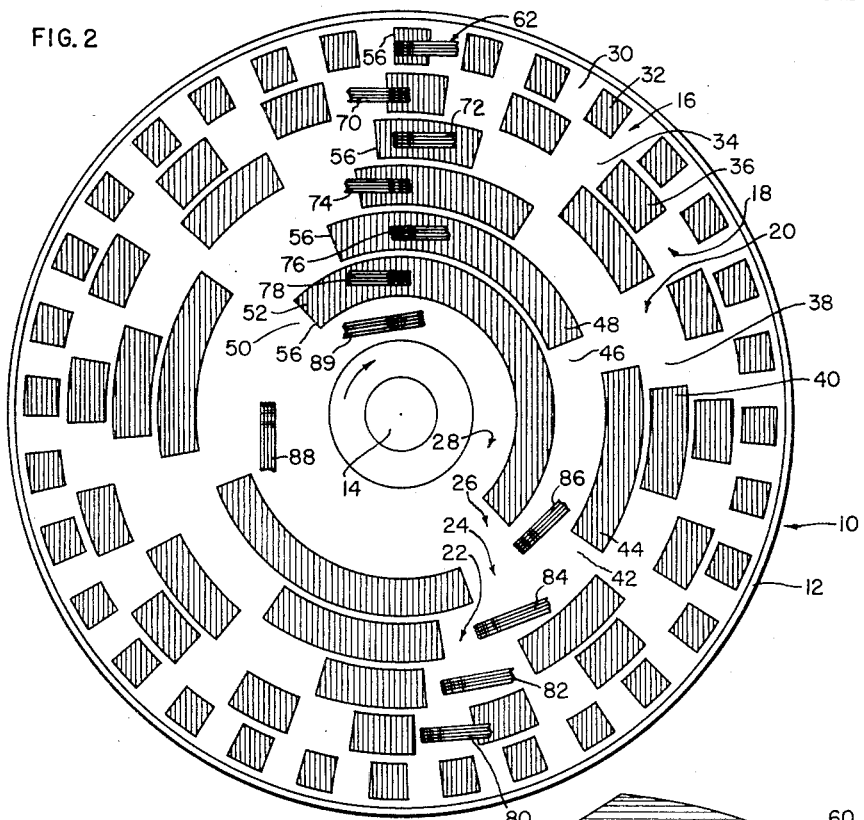
Figure 2 is an enlarged plan view somewhat schematically illustrating the appearance of the information member and the disposition of the brushes relative to the information member, the brush assembly and some of the brushes being shown in fragmentary form to illustrate clearly the appearance of the information member.

For reasons which will be explained in detail subsequently, the leading edges of the portions in each track are displaced by particular angular distances from the leading edges of the portions in the other tracks. For example, when a binary code is to be used, the leading edge of corresponding portions in the tracks 18, 20, 22, 24 and 26 trail the leading edges of the portions in the track 16 by an angular distance equal to substantially one fourth of the angular length of the portions in the track. This may be seen in Figure 2 by a comparison of leading edges designated at 56 for corresponding conductive portions in each track.

A plurality of brushes are supported by a block 60 at positions slightly above the disc 12. The block 60 may be provided with a substantially rectangular shape and may be made from suitable material such as that known as melamine. This material is desirable because it is a good electrical insulator, is dimensionally stable with changes in temperature, and is a repellant of moisture and fungicides.

Each of the brushes is connected as by a solder joint to a lead which extends through a hole in the block 60. For example, a brush generally indicated at 62 in Figure 3 is shown as being solder connected as at 63 to a lead 64 extending through a hole in the block. The solder connection 63 is made in a socket in the block, the socket thereafter being filled with a suitable insulating material 65 such as that formed from 90% of resin (Shell Epon Adhesive VII) and 10% of catalyst (Shell Curing Agent "A").

The brushes extend inwardly from the periphery of the block 60 a suitable distance such as approximately ¼ inch and have a downwardly hooked portion at their free end. For example, the brush 62 is shown in Figure 3 as having a horizontal portion 66 and a downwardly hooked portion 68 at the end of the horizontal portion 66. The hooked portion 68 may have a suitable radius such as approximately 0.013 inch.

The hooked portions on the different brushes such as the portion 68 are positioned to ride on the surface of the disc 12 to produce electrical signals as they contact conductive portions on the disc. In order to insure the production of electrical signals, each brush such as the brush 62 is made from a plurality of wires such as four wires. Each of the wires may be provided with a suitable diameter such as approximately six thousandths of an inch.

The brushes such as the brush 62 may be considered as being divided into two groups with the brush 62 being common to each group. One group is formed by the brush 62 and by brushes 70, 72, 74, 76 and 78. The hooked portions of the brushes 62, 70, 72, 74, 76 and 78 are disposed in substantially aligned relationship along a radial line extending from the center of the disc 10. The brushes 62, 70, 72, 74, 76 and 78 are disposed to contact the conductive and non-conductive portions in the tracks 16, 18, 20, 22, 24 and 26, respectively. Each of the brushes 62, 70, 72, 74, 76 and 78 is disposed in substantially tangential relationship with its associated annular track at its point of contact with the portions in the track.

A second group of brushes is also associated with the conductive and non-conductive portions in the tracks 18, 20, 22, 24 and 26 to contact the portion in the tracks. This second group is formed by the brush 62 and by brushes 80, 82, 84, 86 and 88, the latter brushes being respectively associated with the tracks 18, 20, 22, 24 and 26. Each of the brushes 80, 82, 84, 86 and 88 is disposed in tangential relationship to its associated track at its point of contact with the portions in the track.

The brushes 80, 82, 84, 86 and 88 are separated from their associated brushes 70, 72, 74, 76 and 78 by particular distances. For example, when a binary code is used, the brushes 80, 82, 84, 86 and 88 may be respectively separated from the brushes 70, 72, 74, 76 and 78 by an angular distance equal substantially to one half of the angular length of the conductive and non-conductive portions in the associated track. Since the lengths of the portions in the different tracks are relatively small, the distance between the pairs of brushes in each track would be relatively small. For example, the distance between the brushes 70 and 80 would be only approximately 0.015 inch.

We have found that the brushes 80, 82, 84, 86 and 88 may be displaced from the brushes 70, 72, 74, 76 and 78 by a further angular distance in addition to that specified above. This distance has an integral ratio as compared to the angular lengths of the portions in the different tracks. For example, when the conductive and non-conductive portions 50 and 52 in the track 26 have angular lengths of approximately 180°, the brushes 80, 82, 84, 86 and 88 may be displaced from the brushes 70, 72, 74, 76 and 78 by a further angular distance of 180° in addition to that specified above.

A brush 89 is adapted to contact the conductive surface of the track 28 and is disposed in tangential relationship to the row at its point of contact. The brush 89 may be similar in construction to the brushes described above. The brush 89 is adapted to receive a voltage from a suitable power supply (not shown) and is adapted to supply this voltage at any instant to any of the other brushes which contact conductive portions in their associated track.

The information member and brushes described above are adapted to operate in conjunction with an electrical system shown in block form in Figure 4. This system includes first and second networks 90 and 92 formed from groups of diodes connected in particular electrical patterns. The network 90 is adapted to receive the signals from the brushes 80, 82, 84, 86 and 88.

Each of the networks 90 and 92 also receives signals from a counter 94. The counter 94 counts the signals from a generator 96 which is adapted to produce clock signals at periodic intervals. The output signals from the networks 90 and 92 are respectively introduced to the right and left input terminals in a flip-flop 98, as indicated by lines extending into the lower right and left portions of the block. The voltage on the left output terminal of the flip-flop 98 is introduced to the networks 90 and 92 to control which of the networks is activated at any instant as will be disclosed further hereafter. Output signals are taken from the right output terminal of the flip-flop 98.

The construction and operation of the networks 90 and 92, the counter 94, the clock generator 96 and the flip-flop 98 are disclosed in detail in co-pending application, Serial Number 467,154, filed November 5, 1954, by Leo P. Retzinger. However, it should be appreciated that other systems may be used in conjunction with the information member and the conductor assembly constituting this invention to obtain a conversion of an analogue quantity into a plurality of signals representing the quantity in digital form.

At any instant, the information member 10 is moved relative to the conductor assembly through a distance related to the value of the analogue quantity at that instant. For example, the disc 12 is moved through an angular distance substantially proportionate to the value of the angular quantity at each instant. As the disc 12 is rotated, the various brushes associated with the different annular tracks on the disc contact the conductive and non-conductive portions in different patterns. As will be described in detail subsequently, this pattern causes a particular sequence of signals to be produced upon the production of successive signals by the clock generator 96.

The clock generator 96 is adapted to produce signals at periodic intervals. When the clock generator produces a first signal, it triggers the counter 94 and causes the counter to prepare the networks 90 and 92 for activation. A signal then passes through the network 90 and triggers the flip-flop 98 if the brush 62 is contacting one of the portions in the track 16. When the flip-flop 98 becomes triggered, a relatively high voltage is produced on the right output terminal of the flip-flop 98 and a relatively low voltage is produced on the left output terminal of the flip-flop.

A relatively low voltage on the left output terminal of the flip-flop 98 causes the network 92 to be prepared for activation upon the production of the second signal by the clock generator 94. When the second clock signal occurs, the network 92 passes a signal if the brush 80 is not contacting a conductive portion in the track 18.

This signal triggers the flip-flop 98 so that a relatively high voltage is produced on the left output terminal of the flip-flop and a relatively low voltage is produced on the right output terminal of the flip-flop.

The relatively high voltage on the left output terminal of the flip-flop 98 prepares the network 90 for activation. When the next clock pulse is produced by the clock generator 96, it triggers the counter 94. The counter 94 then acts on the network 90 so that a signal can pass through the brush 72 to the flip-flop 98 to trigger the flip-flop. However, if the brush 72 is not contacting a conductive portion in the track 20, a triggering signal cannot pass to the flip-flop. This causes the flip-flop 98 to remain in its previous state of operation such that a high voltage is produced on the left output terminal of the flip-flop. The high voltage on the left output terminal of the flip-flop 98 prepares the network 90 for activation upon the occurrence of the next clock signal.

In this way, the flip-flop 98 operates at any instant to determine whether the network 90 or the network 92 is prepared for activation. If the network 90 becomes prepared for activation, a particular one of the brushes 70, 72, 74, 76 and 78 is selected depending upon the signal from the counter 96. If the network 92 becomes prepared for activation, a particular one of the brushes 80, 82, 84, 86 and 88 is selected in accordance with the operation of the counter 94. The disposition of the selected brush relative to the conductive portions in its associated track determines whether or not a triggering signal passes to the flip-flop 98. In this way, the selected brush controls whether the network 90 or the network 92 is selected by the flip-flop 98 for activation upon the occurrence of the next clock signal.

The information member 10 and brush assembly described above have several important advantages. By using a pair of brushes in association with each track except the track 16, ambiguities in the production of output signals are avoided. Ambiguities are avoided since a particular one of the brushes in each pair is selected in accordance with the signal produced by the brushes in the previous track.

The information member 10 and brush assembly also provide certain advantages because of the positioning of at least half of the brushes. This advantageous positioning results from the disposal of the brushes 16, 70, 72, 74, 76 and 78 in radial alignment, with each of the conductors pointing in the same tangential direction. Since the brushes 16, 70, 72, 74, 76 and 78 are disposed in radially aligned relationship, their hooked portions corresponding to the portion 66 can be accurately formed in a single operation and by a single die.

By minimizing any errors in the disposition of at least half of the brushes, any errors in the relative positioning of the brushes in each pair can be minimized. This is important since the wrong signal can be generated by a pair of brushes if the distance between the brushes in the pair is in error by a distance equal to or greater than one fourth of the length of the conductive and non-conductive portions contacted by the brushes. For example, since the portions in an outer track such as the track 18 have lengths in the order of only 0.060 inch, the wrong signals can be generated by the brushes 70 and 80 if the brushes are separated by a distance in error by approximately only 0.008 inch.

Accuracy in the positioning of the brushes is also obtained by disposing the brushes 80, 82, 84, 86 and 88 on the opposite side of the disc 12 from the brushes 70, 72, 74, 76 and 78. In this way, all of the brushes do not have to be crowded on the same side of the disc. Furthermore, any possibility of upsetting the positioning of one brush while adjusting the positioning of another brush can be minimized.

The accuracy in the positioning of the different brushes is not only enhanced but the cost of properly positioning the brushes is also considerably reduced. This results from the fact that the die for forming the hooked portions corresponding to the portion 66 can be made relatively inexpensively. The die can be made relatively inexpensively since at least half of the crimping members in the die can be in an aligned relationship.

The relative disposition of the conductive portions in the different tracks is also advantageous for another reason. Since the leading edges of corresponding conductive portions in the different tracks are in staggered relationship, the continuity of the conductive path through the information member from the brush 89 to any of the other brushes such as the brush 80 is enhanced. For example, the electrical path from the brush 89 to the brush 80 would include conductive portions in each of the tracks 26, 24, 22, 20 and 18.

It should be appreciated that the information member 10 need not necessarily be in the form of a disc 12. For example, it is entirely possible for the information member to be moved in a linear direction and for the tracks of conductive and non-conductive portions corresponding to the tracks 16, 18, 20, 22, 24 and 26 to be disposed linearly in the direction of movement of the member. It should also be appreciated that the conductive and non-conductive portions do not have to be disposed on a face of the disc as shown in the drawings, but can also be disposed on the annular periphery of the disc.

I claim:

1. In combination for converting an analogue quantity into a plurality of signals representing the quantity in digital form, a first plurality of brushes disposed in substantially linear relationship, an information member movable relative to the brushes in representation of the analogue quantity, a plurality of first and second portions disposed in tracks on the information member in alternate relationship and having leading edges in the direction of movement of the information member relative to the brushes, the portions in each particular track having substantially the same length and a greater length than the portions in the preceding track, the leading edges of the portions in each particular track trailing the leading edges of the portions in selected one of the tracks by a particular amount dependent upon and less than the lengths of the portions in the particular track, and a second plurality of brushes each paired with a different brush in the first plurality and separated from its associate brush in the first plurality by a distance dependent upon the lengths of the portions in the associated track.

2. In combination for converting an analogue quantity into a plurality of signals representing the quantity in digital form, an information member, a plurality of first and second portions disposed in tracks on the information member, the first and second portions in each track having substantially the same length and a different length relative to the portions in the other tracks and having an alternate disposition relative to one another and having a particular displacement at their leading edges from the corresponding portions in a particular one of the tracks, such particular displacement of the portions in each particular track being dependent upon and less than the length of the portions in that particular track, and a plurality of brushes arranged in first and second groups for movement relative to the information member, each brush in a group being associated with the first and second portions in a different track to produce first and second signals in accordance with their disposition relative to the first and second portions in the track, the brushes in one of the groups being substantially aligned relative to one another each of the brushes in the first group being associated with the portions in a different track and each of the portions in the second group being associated with the portions in a different track and being separated from the associated brush in the first group by a distance dependent upon the lengths of the portions in the associated track.

3. In combination for converting an analogue quantity into a plurality of signals representing the quantity in digital form, a plurality of brushes disposed into first and second groups, the brushes in the first group being disposed in substantially aligned relationship, an information member movable relative to the brushes in representation of the analogue quantity to be converted, a plurality of first and second portions disposed in tracks on the information member in alternate arrangement, the portions in each track having substantially equal lengths and lengths increasing in a progressive geometric relationship with respect to the lengths of the portions in the preceding tracks, the leading edges of the portions in each track being displaced from the corresponding leading portions in a selected one of the preceding tracks by a distance equal substantially to one-fourth of the length of the portions in the selected track, the brushes being formed from a plurality of thin, resilient and closely spaced wires and being hooked at one end to contact the information member, and a block for holding the brushes at the opposite ends of the brushes.

4. In combination for converting an analogue quantity into a plurality of signals representing the quantity in digital form, a first plurality of brushes, a second plurality of brushes, an information member movable relative to the brushes in accordance with the value of the quantity to be converted, and a plurality of first and second portions disposed in tracks on the information member in alternate relationship in each track, the portions in each particular track having substantially equal lengths and lengths substantially twice as great as those of the portions in the preceding track, the leading edge of particular portions in each particular track being displaced relative to the leading edge of the corresponding portions in a selected one of the preceding tracks by a distance related to the length of the portions in the particular track and less than the lengths of the portions in the particular track and being displaced by this distance in an opposite direction to the direction of movement of the information member relative to the brushes, each of the brushes in the first plurality being associated with a different track to produce signals in accordance with its disposition relative to the first and second portions in the associated track, each of the brushes in the second plurality also being associated with a different one of the brushes in the first plurality and being separated from its associated brush by a distance related to the lengths of the portions in the associated track for selection of only one of the brushes in each track in accordance with the information obtained from the adjacent track.

5. In a combination as set forth in claim 4, the leading edge of portions in each particular track being displaced from the leading edge of portions in the selected one of the preceding tracks by a distance substantially equal to one fourth of the length of the portions in the particular track, and the brushes in the first and second pluralities being disposed to contact the portions in their associated track and the brushes in the first plurality being disposed to contact the associated track in an aligned arrangement relative to one another, and means including a block for retaining the brushes in the first plurality in an aligned relationship.

6. In combination for converting an analogue quantity into a plurality of signals representing the quantity in digital form, a plurality of brushes disposed in first and second groups, an information member movable relative to the brushes in representation of the analogue quantity to be converted, a plurality of conductive and non-conductive portions disposed on the information member in tracks and in alternate relationship in each track, the conductive and non-conductive portions in each track having substantially equal lengths and lengths substantially twice as great as the lengths of the portions in the preceding tracks, the forward edge of portions in each particular track trailing the forward edge of corresponding portions in a selected one of the preceding tracks by a distance equal to substantially one fourth of the length of the portions in the particular track, each of the brushes in the first group being associated with the portions in a different track, the brushes in the first group being disposed for contact with at least the conductive portions of their associated track and being disposed in substantially aligned relationship at their positions of contact, each of the brushes in the second group being associated with the portions in a different track and being displaced from their associated brush in the first group by a distance different from an integral length by an amount equal to substantially one half of the length of the portions in the associated track.

7. In combination for converting an analogue quantity into a plurality of signals representing the quantity in digital form, an annular rotatable information member, a plurality of first and second portions disposed in angular tracks on the member in alternate relationship in each track, the first and second portions in each track having substantially equal angular lengths, the portions in successive tracks having angular lengths increasing in a progressive geometrical relationship, the leading edges of corresponding portions in each particular track being angularly behind the portions in a selected one of the preceding tracks in the direction of rotation of the information member and by an angular distance related to and less than the lengths of the angular portions in the particular track, a first plurality of brushes each associated with the first and second portions in a different track, the brushes in the first plurality being radially aligned to provide signals in accordance with their disposition relative to the first and second portions in their associated track, and a second plurality of brushes each associated with the first and second portions in a different track and displaced from its associated brush in the first plurality by an angular distance of at least 180 degrees.

8. In combination for converting an analogue quantity into a plurality of signals representing the quantity in digital form, a plurality of brushes disposed into first and second groups, the brushes in the first group being disposed in aligned relationship with respect to one another, an information member movable relative to the brushes in representation of the analogue quantity to be converted, and a plurality of first and second portions disposed in tracks on the information member in alternate arrangement, the portions in each particular track having substantially equal lengths and lengths increasing in a progressive geometric relationship with respect to the lengths of the portions in the preceding tracks, each of the brushes in the second group being associated with a brush in the first group and being separated from the brush in the first group by a distance related to the length of the portions in the associated track.

9. In combination for converting an analogue quantity into a plurality of signals representing the quantity in digital form, an annular rotatable information member, a plurality of first and second portions disposed in angular tracks in alternate relationship in each track, the angular lengths of the portions in each track being substantially equal and being substantially twice as great as the angular lengths of the portions in the preceding track to provide a digital significance twice as great as the portions in the preceding track, the leading edge of corresponding portions in each particular track being displaced from the leading edge of corresponding portions in the track of least digital significance by an angular distance equal to substantially one fourth of the angular lengths of the portions in the particular track and being displaced by this distance in a direction opposite to the direction of rotation of the information member, and at least a first plurality of brushes, the brushes in the first plurality being disposed in aligned relationship, each of the brushes in the first plurality being coupled to the first and second portions in a different track to provide signals in accordance with the disposition of the brush relative to the portions in the coupled track, and a second plurality of brushes disposed on the diametrically opposite side of the information member from the first plurality of brushes, each of the brushes in the second plurality being coupled to the first and second portions in a particular track other than the track of least significance and being displaced from the brush coupled to the track of least significance an angular distance substantially one half of the angular length of the first and second portions in the particular track.

10. In combination for converting an analogue quantity into a plurality of signals representing the quantity in digital form, an annular rotatable information member, a plurality of first and second portions disposed in annular tracks in alternate relationship in each track, the angular lengths of the portions in each particular track being substantially equal and being substantially twice as great as the angular lengths of the portions in the preceding track and having a digital significance directly related to the lengths of the portions in the particular track, the leading edge of corresponding portions in each particular track being displaced rearwardly from the leading edge of portions in the track of least significance by an angular distance equal to substantially one fourth of the angular lengths of the portions in the particular track, a first and second plurality of brushes disposed in radial alignment, each of the brushes being associated with the first and second portions in a different track to provide signals in accordance with the disposition of the brush relative to the portions in the associated track, each of the brushes being formed from a plurality of thin, resilient and closely spaced wires hooked at one end to contact the portions in the associated track, and a block for holding the brushes in the first plurality at the ends opposite the hooked portions on the brushes and for holding the brushes in the first plurality in radially aligned relationship.

References Cited in the file of this patent

UNITED STATES PATENTS

| | | |
|---|---|---|
| 1,391,652 | Meitner | Sept. 20, 1921 |
| 2,590,110 | Lippel | Mar. 25, 1952 |
| 2,736,017 | Marlowe | Feb. 21, 1956 |
| 2,750,584 | Golfisher | June 12, 1956 |

FOREIGN PATENTS

| | | |
|---|---|---|
| 207,973 | Germany | Mar. 12, 1909 |